April 6, 1943.  F. A. FITZLOFF  2,315,950
ATTACHMENT FOR CORN PICKERS
Filed May 14, 1941
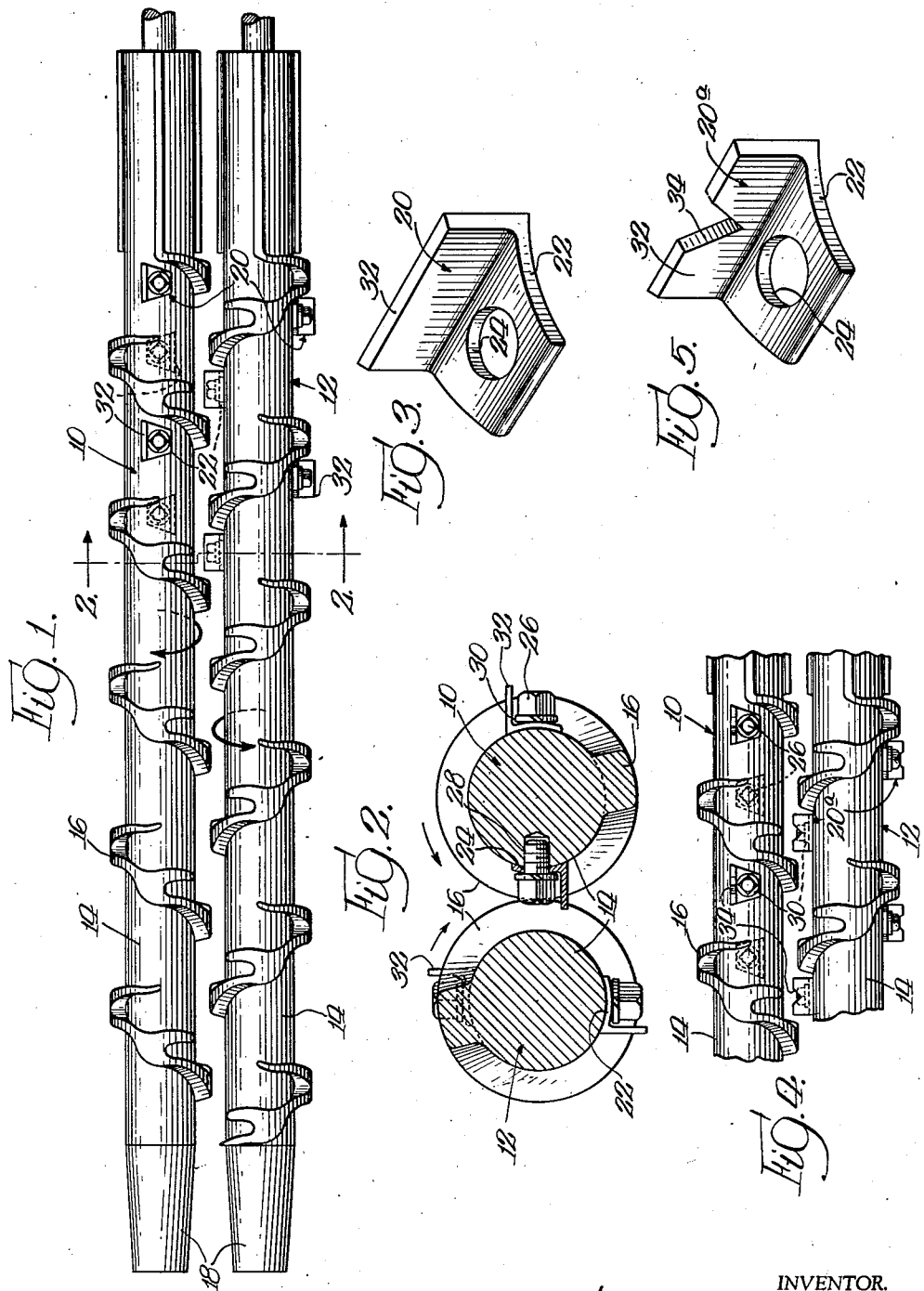
INVENTOR.
Frank A. Fitzloff,
BY Bair & Freeman
Attys Patented Apr. 6, 1943

2,315,950

UNITED STATES PATENT OFFICE 2,315,950

ATTACHMENT FOR CORN PICKERS

Frank A. Fitzloff, Spencer, Iowa

Application May 14, 1941, Serial No. 393,355

5 Claims. (Cl. 130—5)

In the conventional type of corn picker, involving two rotating rolls arranged parallel to each other and inclined to the ground, difficulty is often experienced in dry weather from the fact that husks and refuse plug up the snapping rolls, causing the picking efficiency of the machine to be very poor.

It is an object of my invention to provide an attachment for the snapping rolls of corn pickers of this type, which will carry the dry husks, stalks and refuse through the snapping rolls, so that such material will not jam between the rolls, nor will it be carried up and thrown with the ear corn on to the husking rolls.

It is a further object of my invention to provide such an attachment which can be conveniently and simply applied to the snapping rolls of a corn picker in dry weather, and easily removed in damp weather, when it is not needed.

It is another object to provide a trash lug attachment which will pull refuse through between the rolls effectively, but which will not damage ear corn as the latter is moved up the rolls.

Another object is to provide an attachment of the kind described which can be cheaply and easily manufactured, which is simple and fool-proof in operation, and involves a minimum of time and inconvenience for upkeep and replacement.

With these and other objects in view, my invention consists in the construction, arrangement and combination of the various parts of my attachment, whereby the objects contemplated are attained, as hereinafter more fully set forth, pointed out in my claims, and illustrated in the accompanying drawing, in which:

Figure 1 is a lay-out view showing a pair of snapping rolls in substantially the relation they occupy when installed in the corn picker. The rolls are shown in the figure as viewed from below.

Figure 2 is a vertical cross sectional view taken on the line 2—2 of Figure 1.

Figure 3 is an enlarged perspective view of the attachment constituting my invention.

Figure 4 is a view similar to a portion of Figure 1, except that it shows a modified form of lug attached to the rolls.

Figure 5 is an enlarged perspective view, similar to Figure 3 showing the modified form of attachment lug.

In the drawing I have used the reference character 10 to indicate generally one of the snapping rolls of a corn picker, and the reference numeral 12 to indicate generally the coacting roll. Each of these rolls has a substantially cylindrical body portion 14 and a spirally arranged integral upstanding rib 16. The bottom ends of the rolls are ordinarily tapered, as seen at 18, to facilitate the entry of corn stalks between the rolls.

The ribs 16 are arranged with opposite pitch on the rolls 10 and 12 so that when the rolls are turned by suitable gearing or other means in the directions indicated by the arrows in Figures 1 and 2, the spiral rib on one roll runs continuously in the space between two convolutions of the similar rib on the coacting roll. The structure thus far described is well understood in the art and serves to snap ears of corn from the stalks and to move the ears upwardly in the trough formed by the two adjacent inclined rollers.

As previously pointed out, however, in very dry weather the stalks, husks and other refuse picked up by the rolls tend to clog the spaces between the rolls. When this occurs the picking operation is oftentimes very unsatisfactory and delays are occasioned by the necessity for stopping the machine to clean out the obstructing matter.

According to my invention, I provide lugs indicated generally by the numeral 20, several of which are attached to the cylindrical portions 14 of the rolls 10 and 12, in such locations that they do not conflict with the interfitting ribs on the rolls, as the rolls rotate.

The lug 20 consists of a base portion 22 which is preferably curved to conform to the cylindrical surface of the body portion 14. A hole 24 is formed in the base portion 22 to pass a bolt or cap screw 26, which passes into a threaded opening 28 in the body 14. A lock washer 30 may be interposed between the head of the bolt 26 and the base portion 22, to retain the parts in tight engagement in service. Attached to the base portion and preferably integral therewith is an upstanding flange 32, of substantially greater height than the rib 16. It should be noted that this flange extends parallel to the axis of the cylindrical surface which the base 22 is curved to fit. Thus a single bolt serves to hold the attachment on the roll, and because of its curved base, the lug will be retained solidly in position with the flange 32 extending parallel to the axis of the roll.

Figures 1 and 2 show how the flange 32 of the lug extends into the inter-space between the two rolls; it serves to pull through this opening the trash which collects when the corn is extremely dry. The rubbish is thrown onto the ground beneath the rollers, where it will no longer interfere with the picking and husking operation.

In Figures 4 and 5, I have shown a modified form of lug, marked 20a. It is in all major respects similar to the lug 20 but has midway of the flange 32 a tapered notch 34. The broken edge of the flange 32 which results from provision of this notch sometimes gives more satisfactory results.

It will be readily appreciated that my device can be easily and cheaply attached to corn picker rolls, since no machine work or modification is necessary other than the provision of a tapped hole in the roll. The rolls for corn pickers of certain makes already have tapped holes located in them, in positions such that my attachments can be secured thereby with entirely satisfactory results. Ordinarily several lugs will be used on each roll, and in the drawing, I have shown four on each roll, two on each side of the roll. I prefer to arrange the lugs on opposite rolls in staggered relation longitudinally of the rolls, and also, as may be seen in Figure 2, in such arrangement that they pass alternately into the interspace between the rolls as the latter rotate.

Some changes may be made in the construction and arrangement of the various parts of my attachment, without departing from the real spirit and purpose of my invention, and it is my intention to cover by my claims, any modified forms of structure or use of mechanical equivalents, which may be reasonably included within their scope.

I claim as my invention:

1. The combination of a snapping roll having a cylindrical body and a spirally arranged upstanding rib thereon, with a removable lug attached to said body portion intermediate the convolutions of said rib, said lug having a thin upstanding flange extending radially from said roll in a plane parallel to the axis thereof.

2. The combination of a pair of parallel snapping rolls, with lugs removably attached thereto, said lugs having upstanding flanges extending radially from said rolls with narrow, sharp outer edges, and being arranged on opposite rolls in longitudinally staggered arrangement.

3. A pair of snapping rolls rotatably mounted in parallel relation to each other, a spirally arranged upstanding rib on each roll, the ribs on the two rolls being of opposite pitch, and removable lugs attached to each of said rolls intermediate the convolutions of the rib thereon, said lugs having upstanding flanges thereon extending radially from said roll further than said rib.

4. A pair of parallel mounted snapping rolls, means rotating said rolls in opposite directions, and projecting lugs removably attached to said rolls in longitudinally staggered arrangement and distributed around the circumference of the rolls, so that the lugs on one roll pass into the interspace between rolls alternately with the lugs on the other roll.

5. In a corn picker having a pair of snapping rolls rotatably mounted in parallel relation to each other, with a spirally arranged rib on each roll, said rolls being rotated in opposite directions at the same speed so that the rib on one runs continuously in the space between the convolutions of the rib on the other, the combination with such rolls of a plurality of pusher lugs removably attached thereto in longitudinally staggered arrangement and distributed around the circumference of the rolls so that the lugs on one roll will pass into the interspace between rolls alternately with the lugs on the other roll, each of said lugs having a base portion curved to conform to the surface of the snapping roll, and an upstanding web along the leading edge of said base portion, extending parallel to the axis of the roll and having a relatively thin outer edge.

FRANK A. FITZLOFF.